Dec. 29, 1964  F. L. COX  3,163,460
CAMPING TRAILERS
Filed Sept. 9, 1963  2 Sheets-Sheet 1
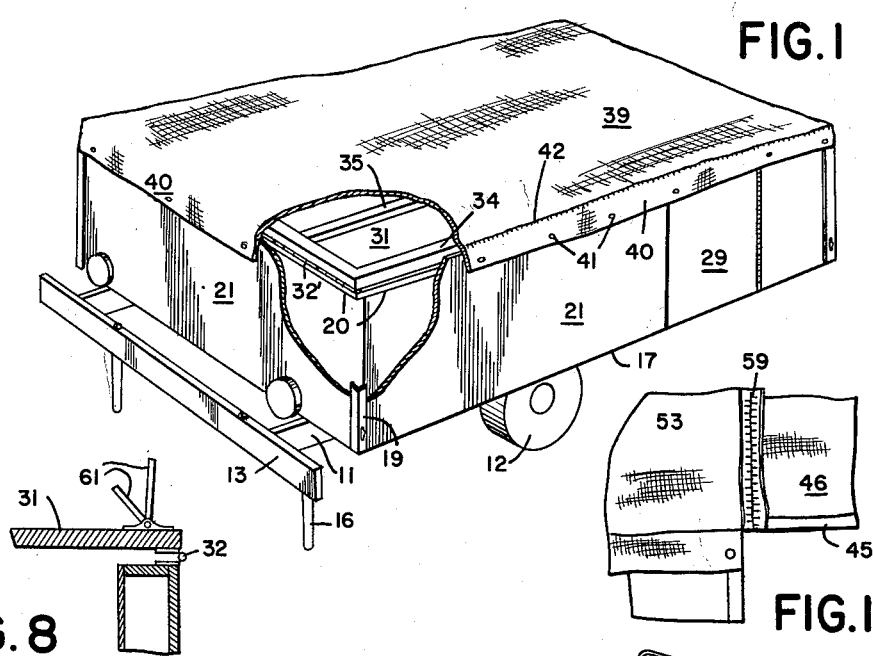
FIG. 1
FIG. 8
FIG. 10
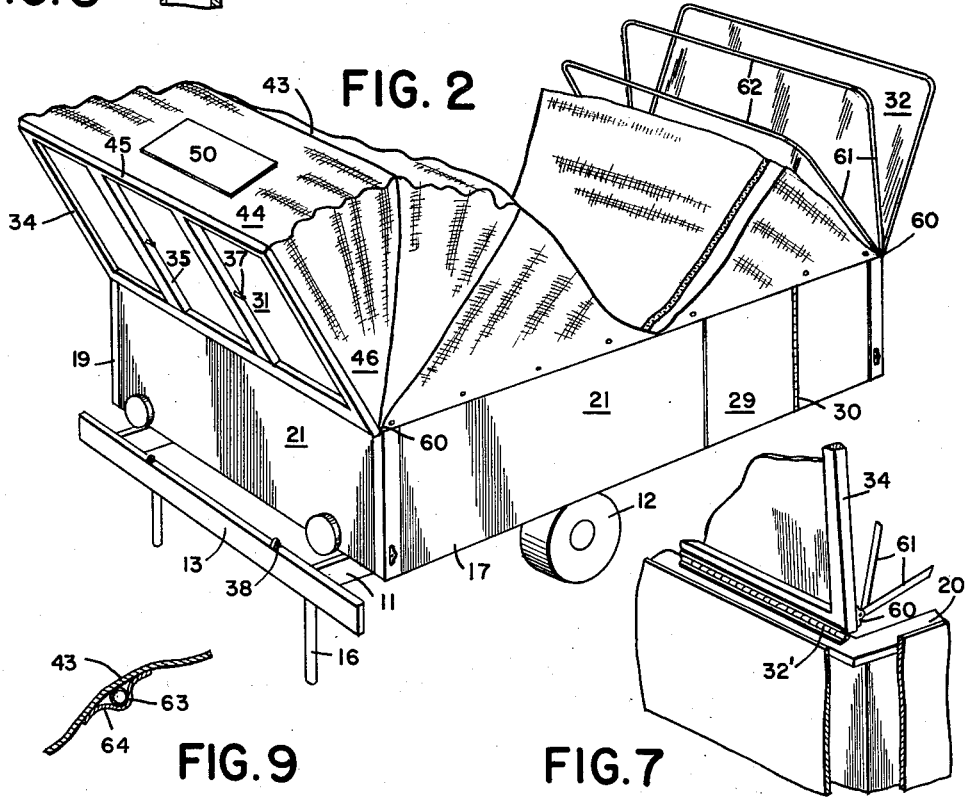
FIG. 2
FIG. 9
FIG. 7

Dec. 29, 1964  F. L. COX  3,163,460
CAMPING TRAILERS
Filed Sept. 9, 1963  2 Sheets-Sheet 2

United States Patent Office 3,163,460
Patented Dec. 29, 1964

3,163,460
CAMPING TRAILERS
Frederic L. Cox, Grifton, N.C.
Filed Sept. 9, 1963, Ser. No. 307,609
4 Claims. (Cl. 296—23)

This invention pertains to vehicular camping trailers of the type which may be compactly folded for towing, and which may be readily unfolded for occupancy in a matter of minutes. More specifically, the present invention pertains to improvements in the type of camping trailer disclosed in the United States patents to Maurice F. Johnson, No. 3,001,813, and Irvin Groh, No. 3,013,836.

A principal object of the present invention is to provide a collapsible trailer which may be quickly expanded for occupancy with a minimum of effort and by one person.

A further object is to provide a camping trailer of the type aforementioned which, when expanded for occupancy, affords full head room throughout the floor area thereof.

Another important object of the present invention is to provide a camping trailer of the type aforementioned which in the folded or collapsed condition is covered by a tarpaulin, the tarpaulin and camping trailer having cooperative means whereby upon opening the trailer the tarpaulin may serve as a canopy or marquee for the entrance thereto.

Still further objects are to provide a camping trailer which is light in weight, and of such simple mechanical constructon as to be marketable at a price appealing to sportsmen and tourists alike.

The foregoing and other objects of the invention will become apparent from the following specification and claims when read in conjunction with the accompanying drawings which form part of this application, and in which drawings like reference characters indicate like parts throughout the several views.

To the above mentioned end, generally stated, the invention consists of the devices and combination of devices hereinafter described and defined in the appended claims.

In the drawings:

FIGURE 1 is a rear perspective of my camping trailer shown in collapsed or towing condition, a portion of the tarpaulin and the meeting wall panels of the trailer being broken away at the near corner;

FIGURE 2 is a perspective from the same vantage point as FIGURE 1, showing the end bed panels swung about three-quarters toward open position, part of the flexible top or covering being broken away from the further bed panel;

FIGURE 7 is a perspective detail of the hinge connection of one of the bed panels to the body, as exposed in the broken away portion of FIGURE 1, with the bed panel being about half-way open and showing the legs of the top supporting stays or bows in an intermediate position;

FIGURE 8 is an end elevation detail corresponding to FIGURE 7, showing a bed panel swung 180° and the final position of the leg ends of the U-shaped top supporting stays or bows;

FIGURE 9 is a detail in cross-section showing the manner the center portions of the several bows are fixed to the top, and FIGURE 10 is a detail of the connection of the front and rear side curtains to the body and to the edge portions of the cubicle.

Figure 4:
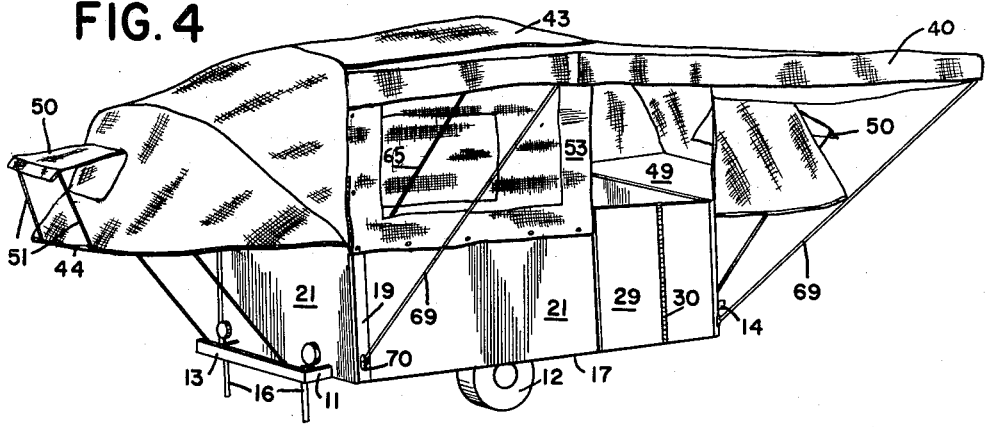
FIGURE 4 is a perspective viewed from the same side as FIGURE 3, showing the tarpaulin applied as a canopy for the entrance.

In general, the present camping trailer includes a wheeled chassis on which is mounted an elongated, boxlike body. Within the body, along one side wall, is formed a box defining a bench structure having a pivotal top which accommodates a mattress, and beneath which top is storage space. Along the opposite side wall is a refrigerator, a sink with water tank therebeneath, a counter, and an entrance door to the aisle between the aforementioned structures. To rectangular bed panels are provided, one being hinged to each end of the body at the upper edge of the latter to swing 180° from a closed position overlying and closing the body to an open horizontal position beyond the body. The ends of a fabric cover or top are attached to the respective outer or free edges of the two bed panels, and pairs of U-shaped stays or bows at each end of the body are associated with said top, body, and/or panel, whereby upon swinging said panels to open position said bows will lift the top and sustain same well above the body, similar to the action of the bow devices against the top of a convertible automobile. Pendent flexible side pieces having window openings covered with netting are connected to the side edges of the center portion of said top; and outer curtains are also likewise connected to said edge portions of said top for covering said pieces during inclement weather, both the pieces and curtains being provided with means for fastening same to one another and/or the body.

Referring now to the annexed drawings for precise details, 11 designates a trailer chassis, which is mounted on wheels 12 bearing high speed pneumatic tires. The chassis is of U-shape and includes cross-pieces (not shown), and a rear bumper bar 13 interconnecting the free rear ends of the chassis. A tongue 14 is connected to the center portion of the chassis and terminates with a coupling 15 for connection to a hitch of the towing vehicle. Vertically adjustable legs 16 are provided at each end of the chassis for sustaining the latter in level position when detached from the towing vehicle, the legs being withdrawn during the towing. The structure just described is conventional.

An elongate, rectilinear, open top body 17 in the form of a box structure on the order of 6½′ x 8′ is secured upon the chassis. The body includes a floor 18, a frame composed of corner posts 19 and top and bottom rail elements 20, as well as side and end walls 21 connected to the frame. The walls may be of sheet metal, plywood, or fiberglass.

The interior of the body (FIGS. 5 and 6) may be lined with sheet metal or other material 22, as desired. Within the body and extending substantially the full length of one side wall is a storage box or boxes 23 having a pivoted lid or lids on which rests a mattress 24, serving by day as a seat for the occupants and as a single bed at night. Along the opposite inner side wall are fixedly located a refrigerator (not shown), a sink 25, with drain, having either a suction or pressurizing pump 26 leading to a water tank therebeneath, and a service counter 27. A drop leaf table 28 is located at either end of the aisle between the aforementioned equipment. A door 29 is hinged at 30 on the utilities side for convenience in entering.

Figure 3:
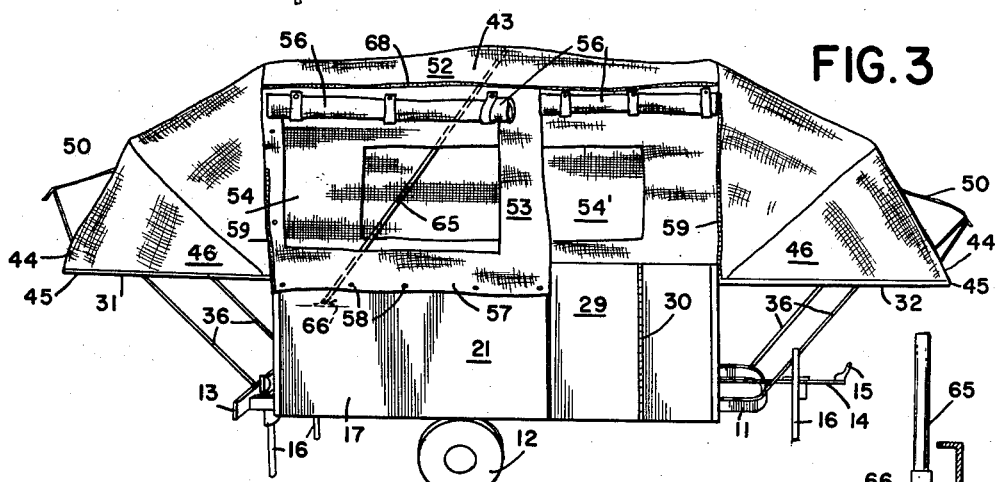
FIGURE 3 is a front side elevation showing the trailer completely open for occupancy.

Two rectilinear oblong bed panels 31 and 32 are provided, each being substantially half the size of the body 17 and each panel is pivoted respectively along its long edge, as by piano hinge 32′, to one of the upper rails 20 of the body frame to swing 180° from the closed position overlying and substantially closing the top of the body (FIG. 1), to the projected or open position shown in FIGURE 3. The bed panels may be of sheet metal, plywood or the like, and as shown are reinforced by a peripheral frame 34 having cross-pieces 35. When the panels are in the open or projected position, additional support for these panels is supplied in the form of braces or rods 36. Two such rods are shown for each bed panel, one end of each rod being engageable with a lug, pin or the like 37 fixed to the cross-pieces 35 of the panels, and the opposite end of each rod engaging a socket, bracket or the like 38 rigid with chassis 11 (FIG. 2). For compactness when not in use, each rod is made in two sections which may be readily rigidly joined.

In the folded or collapsed state of the present trailer, the body is covered by a tarpaulin 39 which has edge flaps 40 designed to lap onto the outer wall of the body and be held thereto by snap fasteners 41. One of the longer edges of the tarpaulin at its juncture with its edge flap is formed with one unit 42 of a slide fastener, for a purpose to be assigned.

Reference character 43 designates a flexible fabric or plastic top for body 17 when panels 31, 32 are swung to open position. The ends 44 of top 43 are attached to the respective outer edges 45 of the bed panels, and the end portion of the top includes flexible side portions 46 which are attached to the side edges of the respective bed panels, thus providing between the panel and the nether surface of the top a sheltered cubicle at each end of the body for reception of mattresses 48, 49, each accommodating two persons. A screened window 49 is provided in the endmost walls 44 of the top, and each of these windows is provided with an awning 50, which may be held away from the window by a pair of removable rods 51.

Top 43 includes an intermediate portion 52 of substantially the same length as body 17, and along the edges of portion 52 depend fabric side pieces 53, which may include screened openings 54. Roll up curtains 56 are provided for those pieces which include a screened opening, as well as for the area above door 29, where a screen is not feasible. Since there is no door on the back side of the trailer, a single piece 53 serves for the entire back area, and its window 54′ is considerably wider than the front window of FIGURE 3. The lower edges 57 of the several pieces 53 may be fastened to the body by snaps 58, and contiguous vertical edges of the pieces are equipped with slide fasteners 59, thus assuring a bugproof connection thereof.

Means are provided in association with the bed panels, body and top 43 whereby upon pivoting of the bed panels from the closed position of FIGURE 1 to the open position the top will be elevated to and held in the position shown in FIGURE 3, which means will presently be described.

Figure 5:
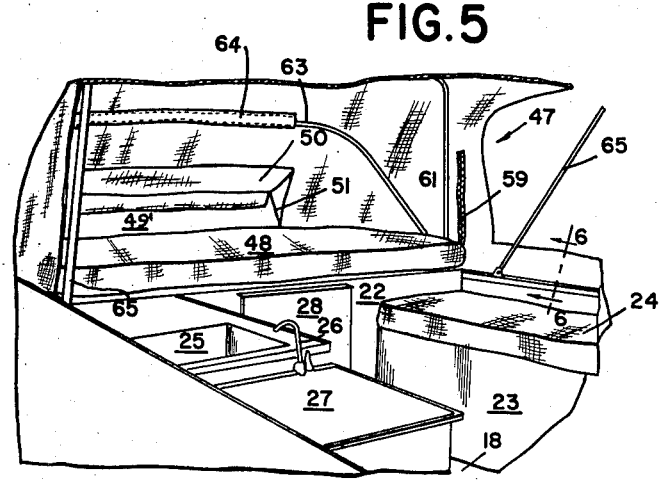
FIGURE 5 is a view of a portion of the interior of the trailer when fully opened, as seen from the right hand corner of FIGURE 3, the top, together with the front side curtain being broken away.
Figure 6:
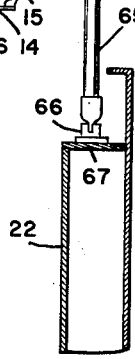
FIGURE 6 is a detail along section line 6—6 of FIGURE 5.

As viewed in FIGURES 1 and 7, to the underside of each bed panel and adjacent its pivotal connection to the rail of the body, there are pivoted at 60 the legs 61 of two U-shaped stays or "bows" 62, as they are called in the trade. The intermediate portion 63 of each bow is fixed to the underside of top 43 at precise points therealong by strips of flexible material 64, running lengthwise the center portions of the bows and sewn along each edge, as shown in FIGURES 5 and 9. In the slack state of top 43 the bows may swing into substantial contact with one another; but as the bed panels are swung outwardly and tend to stretch top 43, FIGURE 2, the bows are drawn apart, and when outward swing of the panels is completed, the intermediate portions of both sets of bows are shifted upwardly to positions 45° and 90°, respectively, from the plane of their respective panels, as shown in FIGURE 8, thus elevating and supporting the end portions of the top to define cubicles therewithin, similar to the operation of the top of a convertible automobile.

To solve the problem of supporting the intermediate portion 52 of the top, I provide a fifth U-shaped bow 65 having legs somewhat longer than those of bows 62. The legs of the fifth bow are pivoted at 66 forwardly of the rear set of bows, on ledges 67 provided within the body at either side thereof, and the central portion of the fifth bow is connected to substantially the mid-point of top 43 in the same way as are the bows 62. As the left bed panel is swung outwardly, FIGURE 2, the first and second bows are drawn upwardly and become progressively spaced, and as the slack is taken up in the top, the fifth bow is connected to substantially the mid-point of 43 becomes taut, the bows and top have reached the position shown in FIGURE 3.

While in the collapsed state, mattresses 48, 49 for the bed panels are kept in the aisle of the body. When the bed panels are in fully open sleeping position, the mattresses may be placed thereon. When the trailer is ready for occupancy, the inside dimension has been lengthened to double that of the body; and provision is made for sleeping five persons—two on each bed panel, and one on the storage box.

The trailer may be occupied in the condition shown in FIGURE 3. As alluded to above, however, it is generally desirable to have a canopy over the entrance. To this end the center portion of the top above door 29 is provided with a unit 68 of a slide fastener complementary to the units 42 on the tarpaulin. The two units may be readily connected, whereby the tarpaulin becomes a canopy, as shown in FIGURE 4. The outer edge portion of the canopy is shown supported by sectional rods 69, the inner sections of which are pivoted on brackets 70.

Preliminary to the folding or collapsing operation, the lower edges of pieces 53 are first released from body 17, and the slide fastener connections of the several contiguous panels are withdrawn, so that these parts may be directed into body 17. When completely closed, the entire top is housed within the body, beneath the two bed panels, the side ledges 67 receiving and supporting the legs of the several bows, and the bed panels resting upon the latter. Both in opening and closing the trailer, the bed panels may be swung to open position either simultaneously or sequentially.

The structure herein disclosed may be easily and quickly prepared for travel and for occupancy at the camp site by one person. In its towing condition, my trailer is highly roadable, and so compact as not to obstruct rear vision of the motorist.

While only a preferred form of the present invention is illustrated and described with particularity, the invention is not limited to the exact structural details thus illustrated and described, but it is to be understood that my invention covers all forms and arrangements which fall within the terms employed in the definition of my invention constituting the following claims.

What is claimed is:

1. A camping trailer comprising a wheeled chassis, a body in the form of a rectangular box secured on said chassis, a pair of rigid bed panels, said panels being hinged respectively at one edge to the fore and aft upper edge of said body to swing 180° from a closed position overlying the body to a horizontal open position therebeyond, a flexible top having its ends connected respectively to the outer edge portions of said panels, a pair of U-shaped bows for each panel, the legs of each pair of bows being pivotally mounted adjacent the pivotal axis of their respective panel and their intermediate portions fastened to said top to move upwardly upon tensioning of said top, whereby upon swinging said panels to open position said top is raised above said body and bed panels, a rectangular tarpaulin for covering said body when the panels are folded in closed position, said tarpaulin having depending flaps for securement to said body, fastening means fixed to and extending along one edge portion of said tarpaulin, and complementary fastening means fixed to and extending along the intermediate side portion of the top for mating engagement with the fastening means of said tarpaulin, and support means for the outer edge portion of said tarpaulin when engaged with said top comprising brace rods disposable between said body and the outer edge portion of said tarpaulin.

2. The apparatus as defined in claim 1 wherein said fastening means on the tarpaulin and on the top are mating units of a slide fastener structure.

3. A camper trailer comprising a wheeled chassis, a body in the form of a rectangular box secured on said chassis, a pair of rigid bed panels each of an area on the order of half that of said body, one of said panels being hinged at one edge thereof to the fore upper edge of said body and the other panel being hinged at one edge thereof to the aft upper edge of said body for each of the panels to swing outwardly from a horizontal closed position overlying said body to a horizontal open position therebeyond, a flexible collapsible top extending across said body and having its ends connected respectively to the outer edge portions of said panels, a pair of U-shaped bows for each panel, the legs of each of the bows being pivotally mounted adjacent the pivot axis of its respective panel to lie substantially horizontal within said body when said panels are in the closed position, the intermediate portions of each pair of bows being fastened to said top to move upwardly and raise said top above said body and panels upon tensioning said top by swinging said panels to open position, an additional U-shaped bow having its legs pivotally mounted intermediate said pairs of bows adjacent the inner side walls of said body, the intermediate portion of said additional bow being attached to the center portion of said top, whereby said additional bow will swing upwardly from a horizontal position within said body for supporting said center portion upon opening of said panels, and means for supporting said panels while in open position.

4. A camper trailer comprising a wheeled chassis and a body in the form of a rectangular open-top box secured thereon, a pair of rigid rectangular bed panels, an edge of one of said panels being hinged to one upper edge of said body and the corresponding edge of the other of the panels being hinged opposite said first panel to the upper edge of said body for each panel to swing outwardly from a horizontal coplanar closed position over-lying said body to a like horizontal position therebeyond, a single flexible elongate collapsible top having its ends fixed respectively to the outermost edges of said panels, at least one generally U-shaped bow at each panel, the legs of each bow being pivotally mounted adjacent the hinge axis of its respective panel to lie substantially horizontal within said body when said panels are in the closed position, with the intermediate portion of each bow attached to the under side of said top at a point above its respective panel to move upwardly and raise said top above said body and panels and to define cubicles above said panels upon tensioning said top by swinging said panels to the open position thereof, and an additional bow having its legs pivoted on said body with its intermedate portion attached to the center portion of said top for sustaining said center portion above said body, said panels being foldable to said closed position overlying said body with the top and bows therebeneath within said body and the bows substantially horizontal.

References Cited by the Examiner

UNITED STATES PATENTS

| 512,273 | 1/94 | Brown | 296—23 |
|---|---|---|---|
| 1,276,388 | 8/18 | Manx | 296—23 |
| 1,881,482 | 10/32 | Gilkison | 296—23 |
| 2,502,024 | 3/50 | Poche | 296—23 |
| 2,640,721 | 6/53 | Kors | 296—23 |

FOREIGN PATENTS 945,356  11/48  France.

A. HARRY LEVY, *Primary Examiner.*